(12) United States Patent
Choi et al.

(10) Patent No.: US 12,095,389 B2
(45) Date of Patent: Sep. 17, 2024

(54) TRIBOELECTRIC NANOGENERATOR USING IONIC ELASTOMER

(71) Applicants: UNIVERSITY-INDUSTRY COOPERATION GROUP OF KYUNG HEE UNIVERSITY, Yongin-si (KR); IUCF-HYU (INDUSTRY-UNIVERSITY COOPERATION FOUNDATION HANYANG UNIVERSITY), Seoul (KR)

(72) Inventors: Duk Hyun Choi, Seongnam-si (KR); Do Hwan Kim, Anyang-si (KR); Hee Jae Hwang, Yongin-si (KR); Joo Sung Kim, Yongin-si (KR); Eun Song Jee, Yongin-si (KR)

(73) Assignees: UNIVERSITY-INDUSTRY COOPERATION GROUP OF KYUNG HEE UNIVERSITY, Yongin-si (KR); IUCF-HYU (INDUSTRY-UNIVERISTY COOPERATION FOUNDATION HANYANG UNIVERSITY), Seoul (KR)

( * ) Notice: Subject to any disclaimer, the term of this patent is extended or adjusted under 35 U.S.C. 154(b) by 646 days.

(21) Appl. No.: 17/264,580

(22) PCT Filed: Jul. 26, 2019

(86) PCT No.: PCT/KR2019/009366
§ 371 (c)(1),
(2) Date: Jan. 29, 2021

(87) PCT Pub. No.: WO2020/027510
PCT Pub. Date: Feb. 6, 2020

(65) Prior Publication Data
US 2021/0336559 A1    Oct. 28, 2021

(30) Foreign Application Priority Data

Jul. 30, 2018 (KR) ........................ 10-2018-0088738

(51) Int. Cl.
*H02N 1/04* (2006.01)
*G01L 1/00* (2006.01)

(52) U.S. Cl.
CPC ............... *H02N 1/04* (2013.01); *G01L 1/005* (2013.01)

(58) Field of Classification Search
CPC .................................. H02N 1/04; G01L 1/005
See application file for complete search history.

(56) References Cited

U.S. PATENT DOCUMENTS

| | | | |
|---|---|---|---|
| 2014/0338458 A1* | 11/2014 | Wang | G01L 1/005 310/309 |
| 2015/0001993 A1* | 1/2015 | Park | H10N 30/30 310/319 |
| 2017/0160817 A1* | 6/2017 | Wang | G06F 3/023 |

FOREIGN PATENT DOCUMENTS

| | | | | |
|---|---|---|---|---|
| KR | 10-2010-0116621 A | 11/2010 | | |
| WO | WO-2018226162 A1 * | 12/2018 | ............. | H01B 1/122 |

OTHER PUBLICATIONS

Ming Liang Jin (An Ultrasensitive, Visco-Poroelastic Artificial Mechanotransducer Skin Inspired by Piezo2 Protein in Mammalian Merkel Cells) (Year: 2017).*

(Continued)

*Primary Examiner* — Eric Johnson
(74) *Attorney, Agent, or Firm* — Sughrue Mion, PLLC

(57) ABSTRACT

The present invention relates to an triboelectric nanogenerator using an ionic elastomer that increases internal electric capacity and allows a large amount of electric charge to be located on a surface to generate a large amount of electrical energy. The triboelectric nanogenerator according to the present invention includes a first electrode; an ionic elastomer disposed on the first electrode and including an (Continued)

elastomer and an ionic liquid; a second electrode disposed to be spaced apart from the first electrode and electrically connected to the first electrode; and an insulator disposed under the second electrode, selectively contacting the ionic elastomer, and formed of a material that has a negative charge compared to the ionic elastomer. In this case, the ionic elastomer and the insulator are brought into contact with each other or are separated from each other by external force, and electrical energy is generated between the first and second electrodes when the ionic elastomer and the insulator are brought into contact with each other and separated from each other.

14 Claims, 12 Drawing Sheets

(56) References Cited

OTHER PUBLICATIONS

Younghoon Lee (Cam-based sustainable triboelectric nanogenerators with a resolution-free 3D-printed system) (Year: 2017).*

WO 2013181952 A1 (Year: 2013).*
JP 2010068643 A (Year: 2010).*
Di Liu (Standardized measurement of dielectric materials' intrinsic triboelectric charge density through the suppression of air breakdown) (Year: 2022).*
Jin, Supporting Information for An Ultrasensitive, Visco-Poroelastic Artificial Mechanotransducer Skin Inspired By PIEZO2 Protien in Mammalian Merkel Cells, Avanced Material, Feb. 10, 2017, pp. 1-34 (Year: 2017).*
Ming Liang Jin et al., "An Ultrasensitive, Visco-Poroelastic Artificial Mechanotransducer Skin Inspired by Piezo2 Protein in Mammalian Merkel Cells" Advanced Materials, Feb. 10, 2017, pp. 1-9, vol. 29.
Younghoon Lee et al., "Cam-based sustainable triboelectric nanogenerators with a resolution-free SD-printed system", Nano Energy, Jun. 8, 2017, pp. 326-334, vol. 38.
Divij Bhatia, "System Design of Frequency Controlled Triboelectric Nanogenerators for Environmental Energy Scavenging", Creative Commons, Feb. 2018, 170 pgs.
Korean Notice of Allowance for 10-2018-0088738 dated, Nov. 19, 2020.
International Search Report for PCT/KR2019/009366 dated, Oct. 30, 2019 (PCT/ISA/210).

* cited by examiner

[FIG. 1]
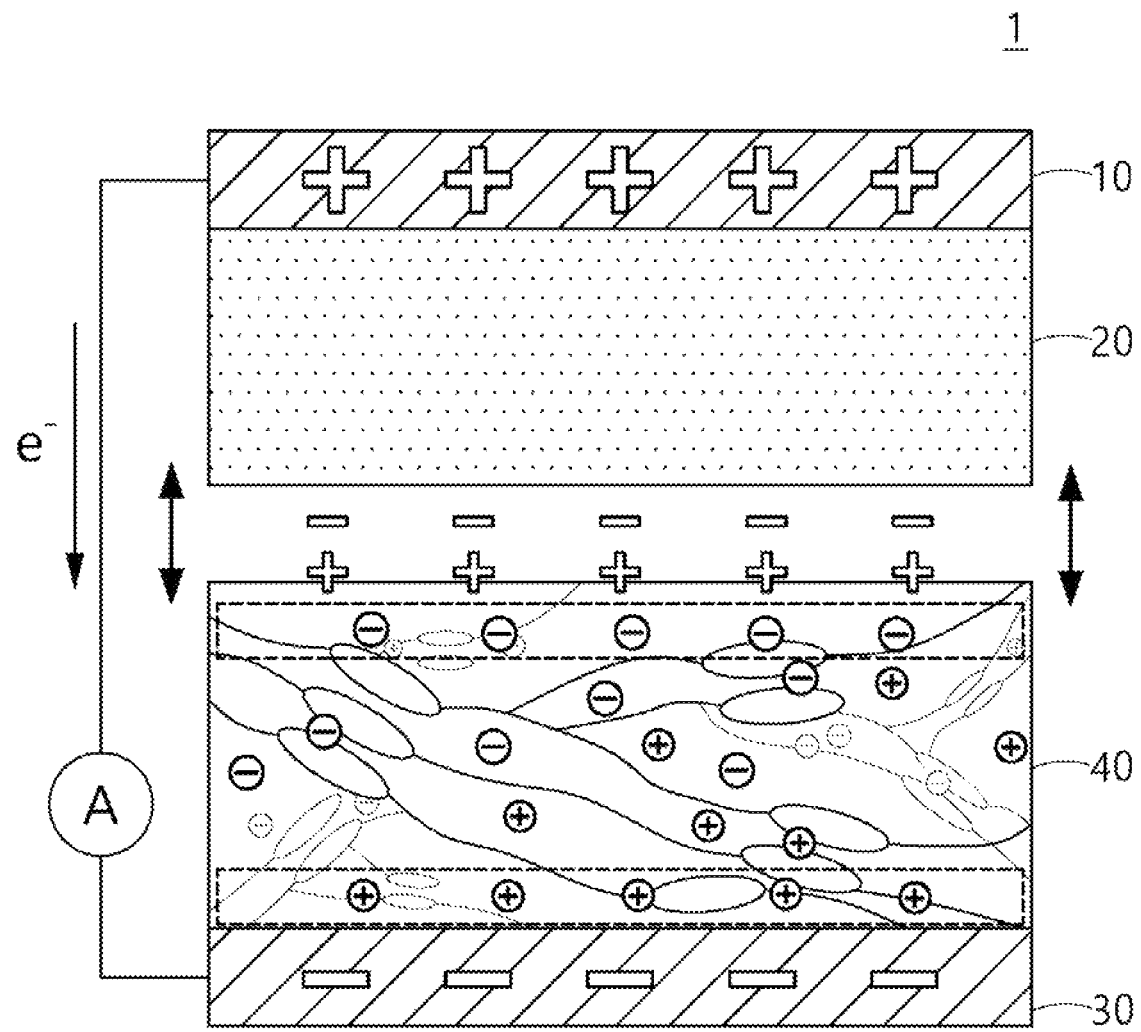

[FIG. 2]
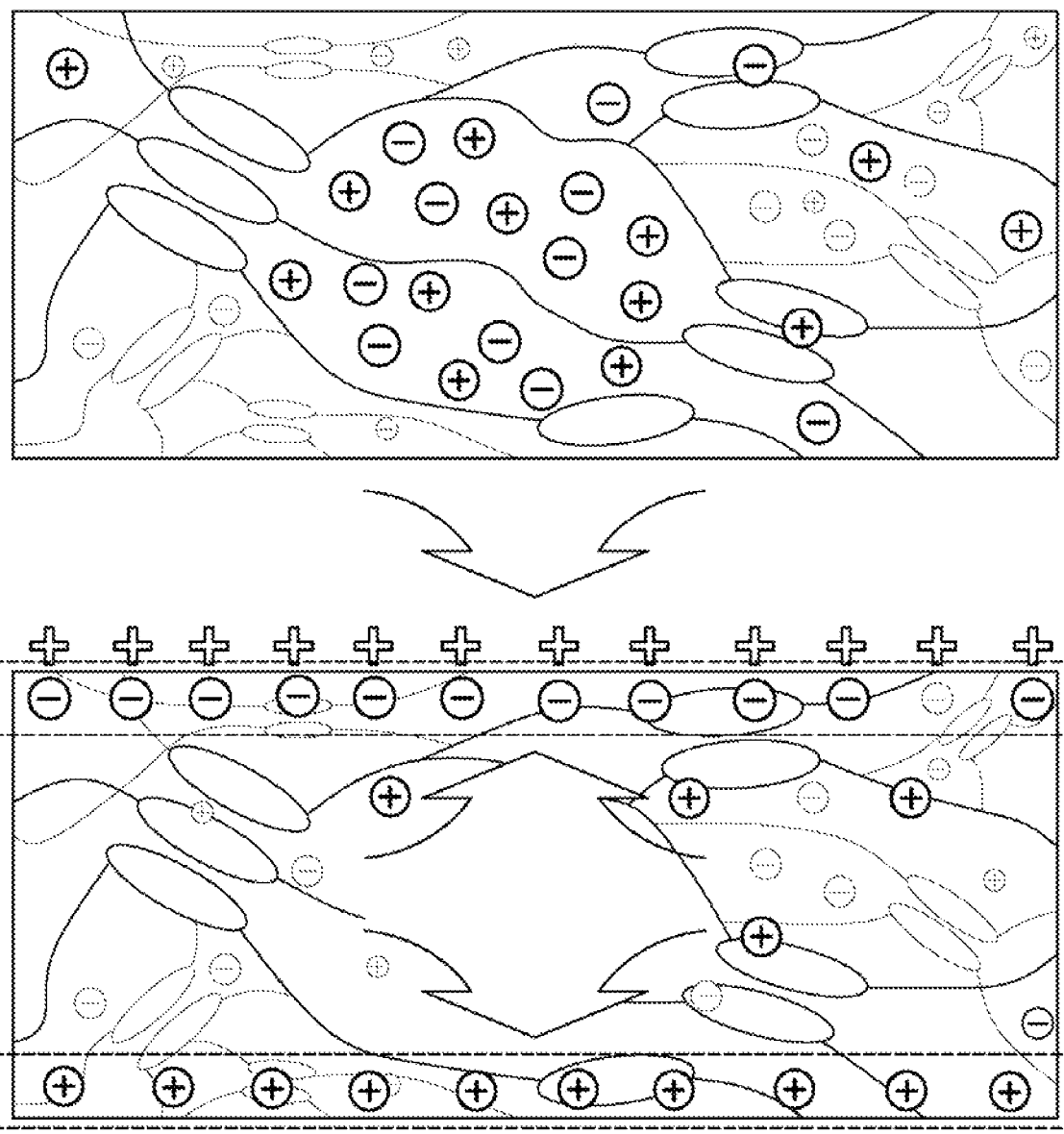

[FIG. 3]
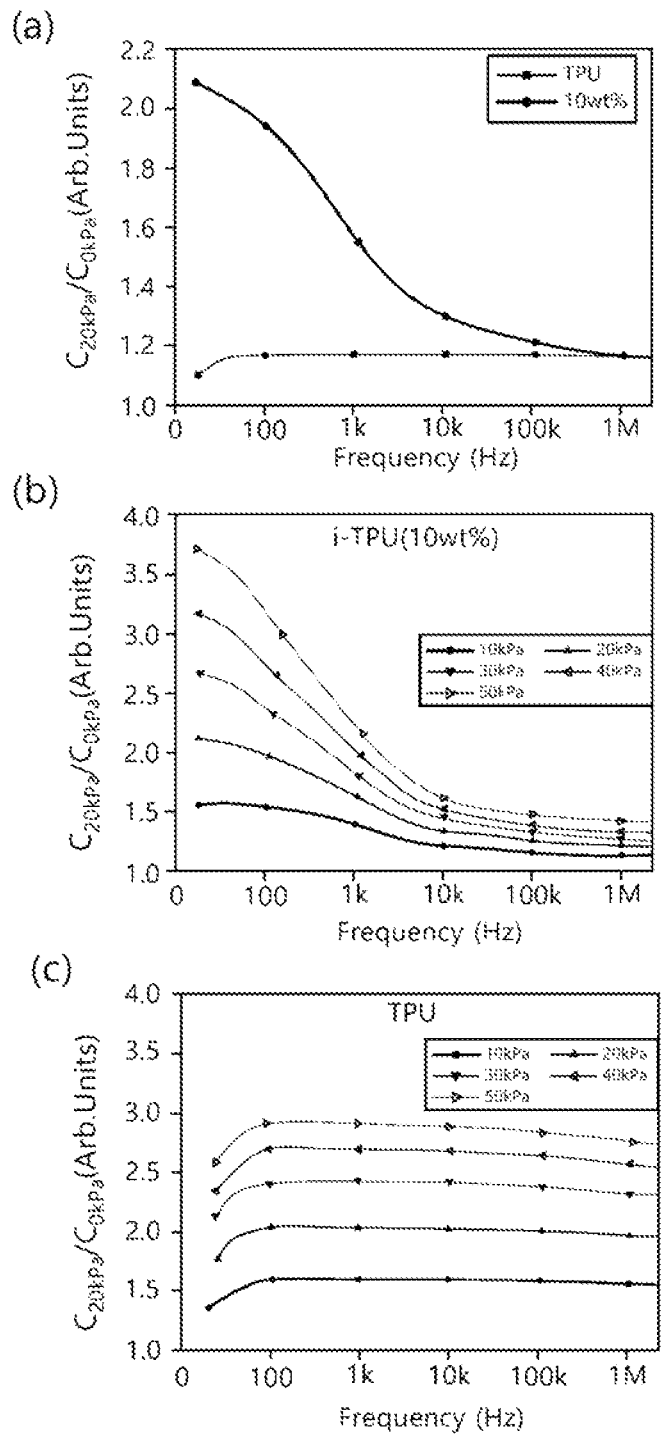

[FIG. 4]
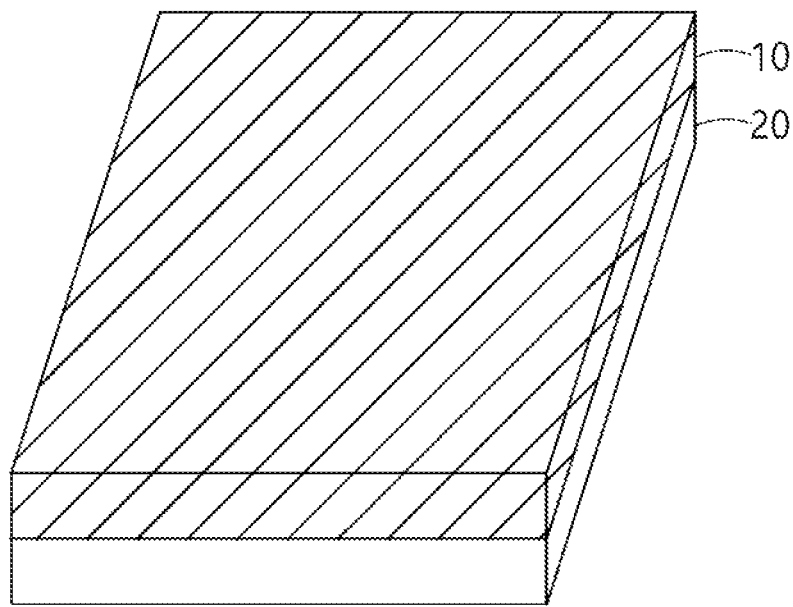
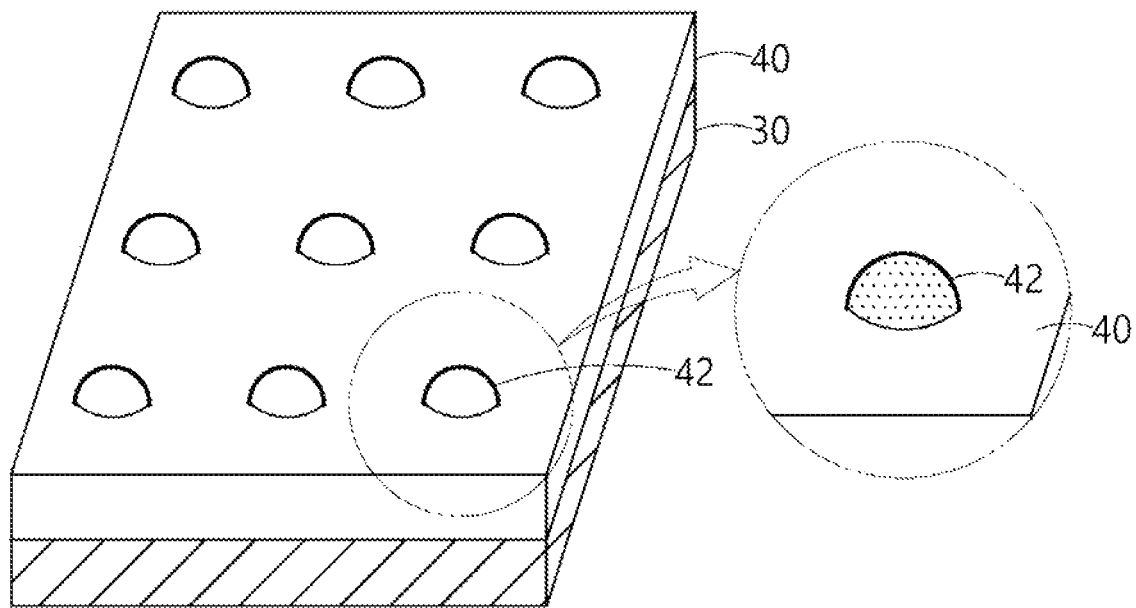

[FIG. 5]
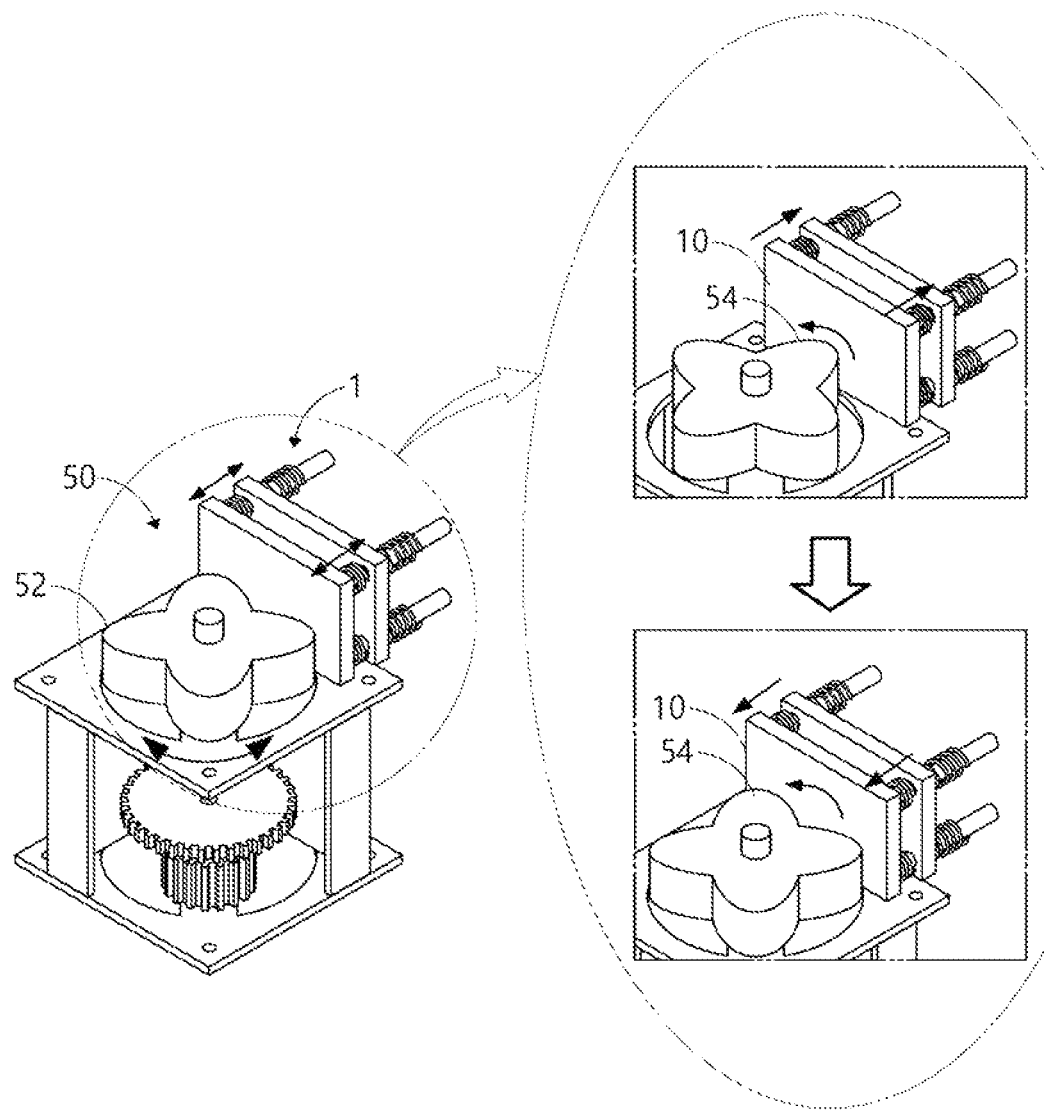

[FIG. 6]
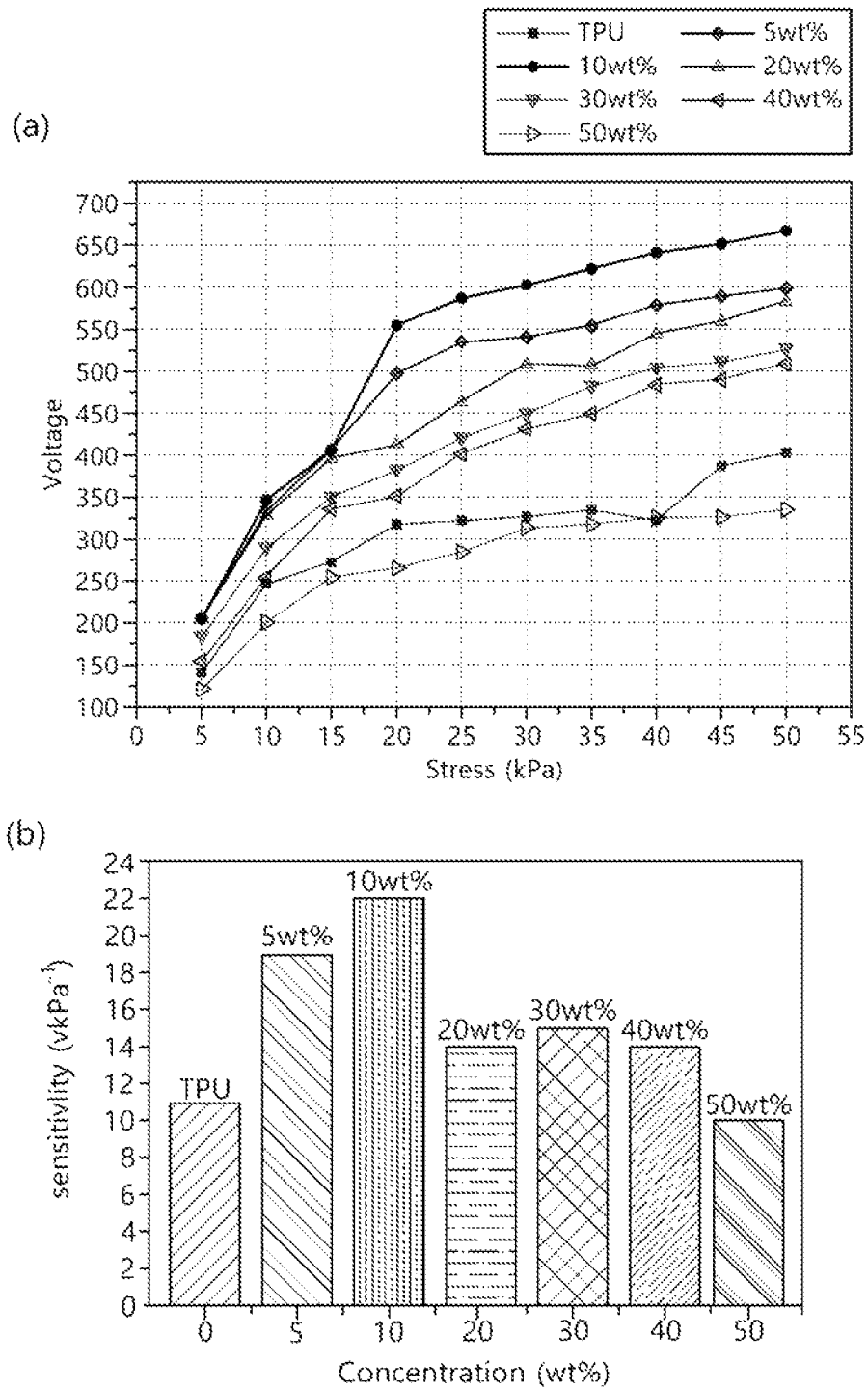

[FIG. 7]
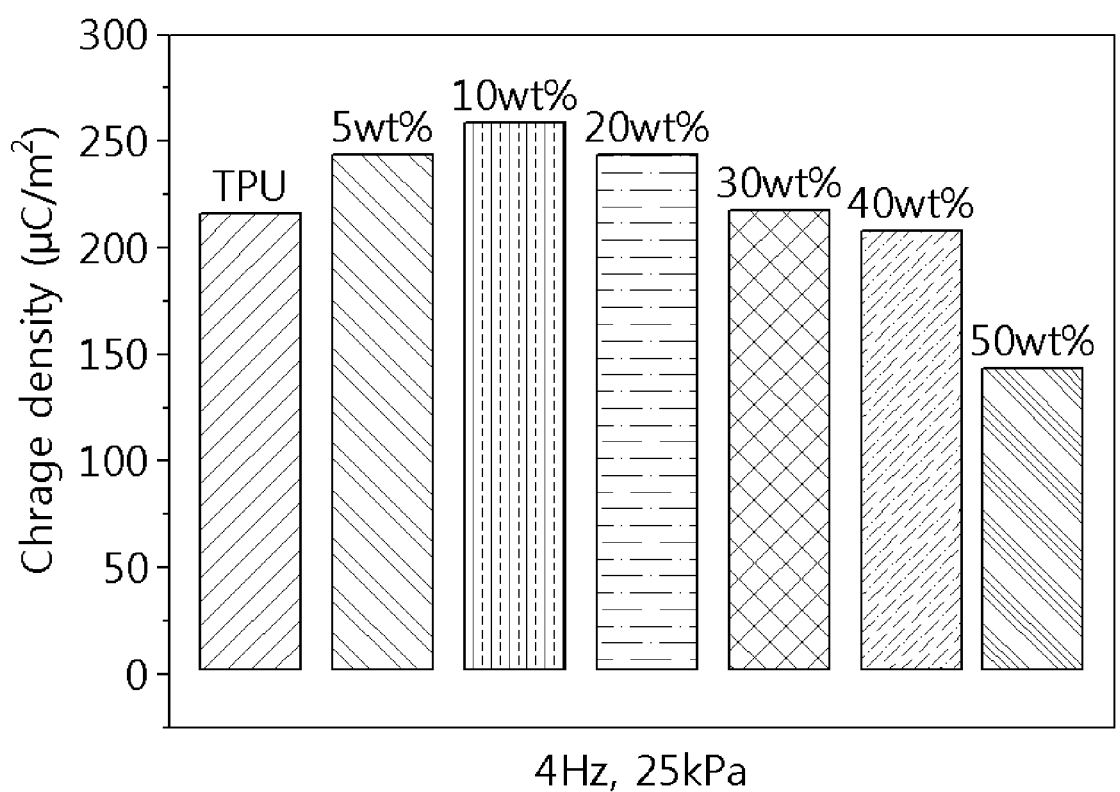

[FIG. 8]
(a)
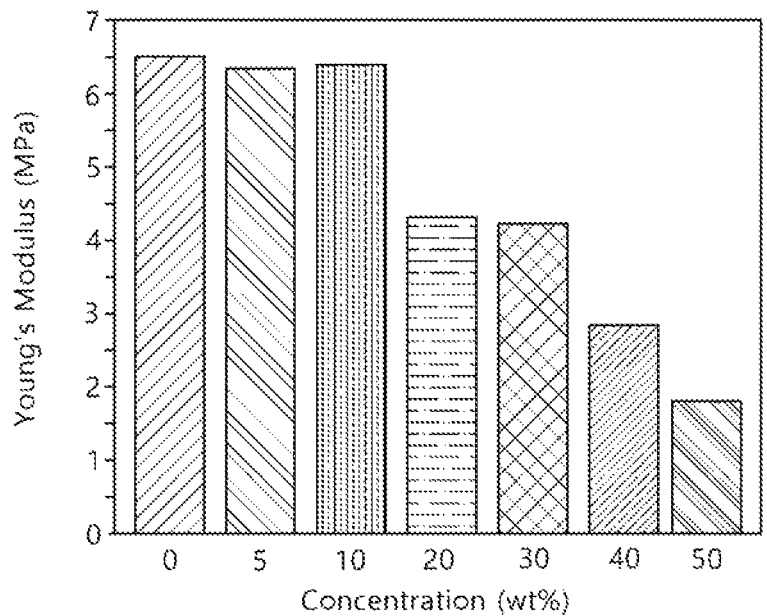
(b)
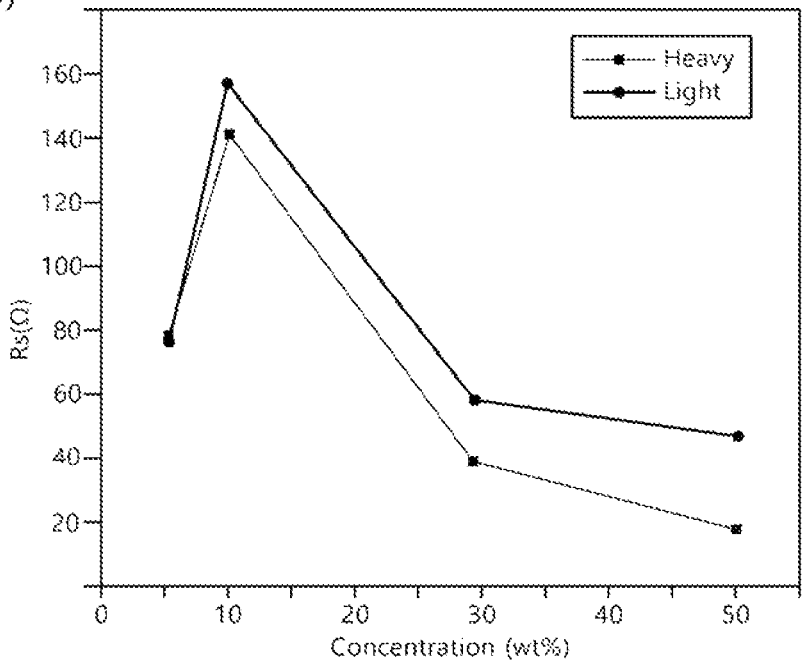

[FIG. 9]
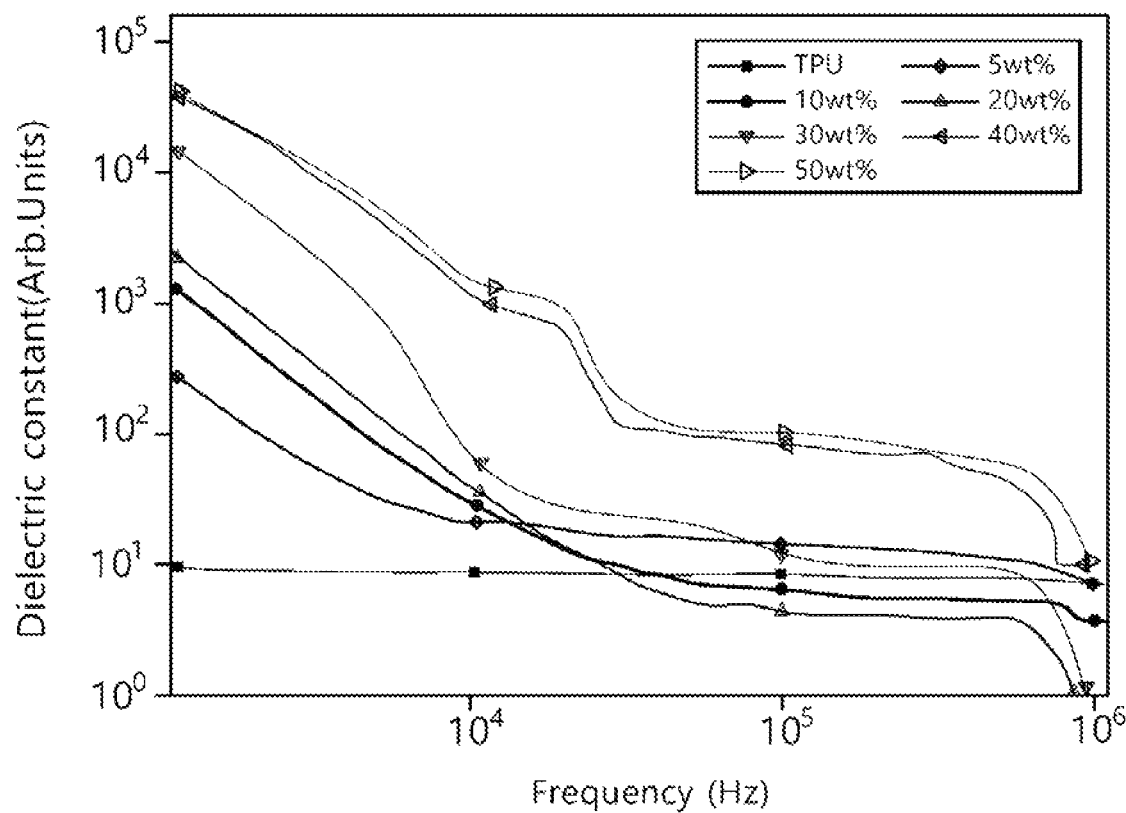

[FIG. 10]
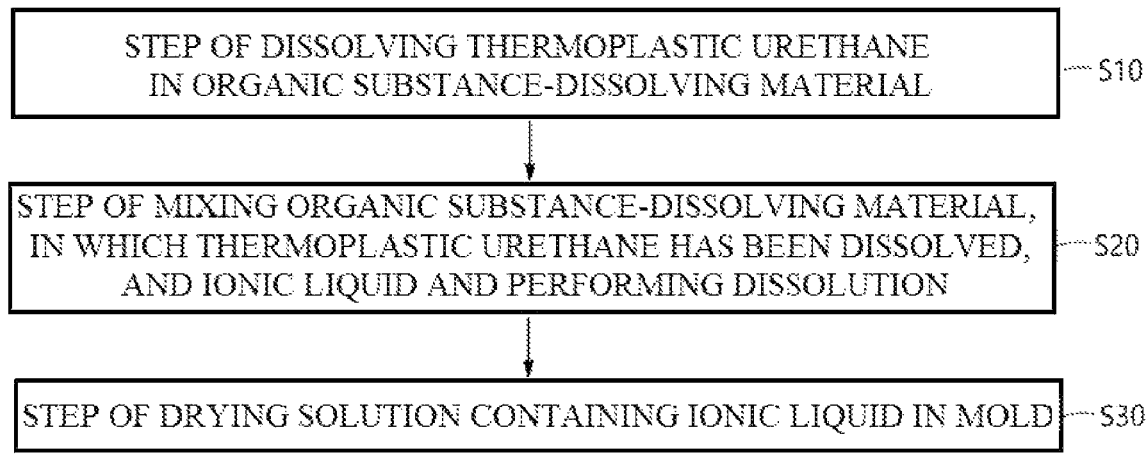

[FIG. 11]
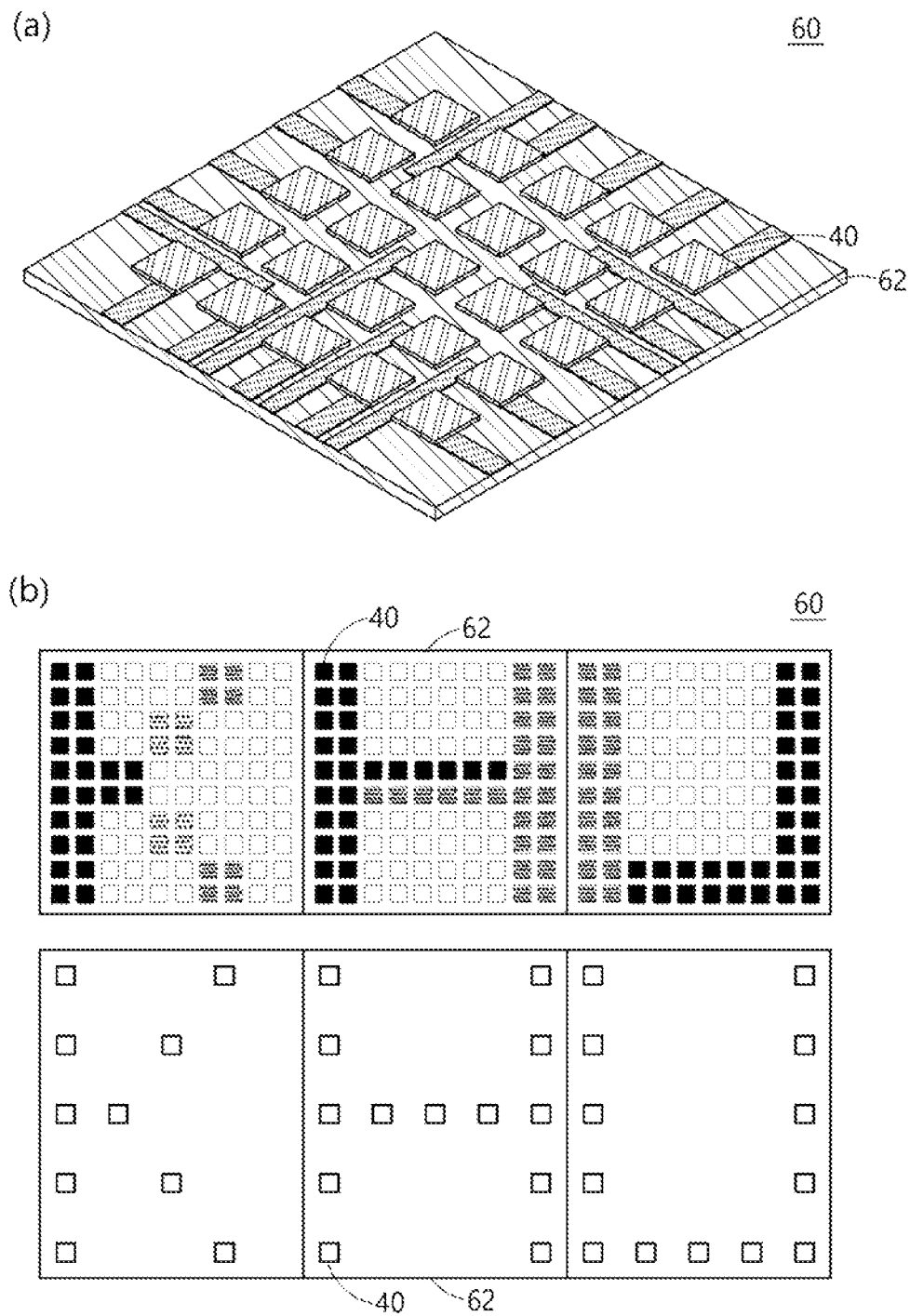

[FIG. 12]
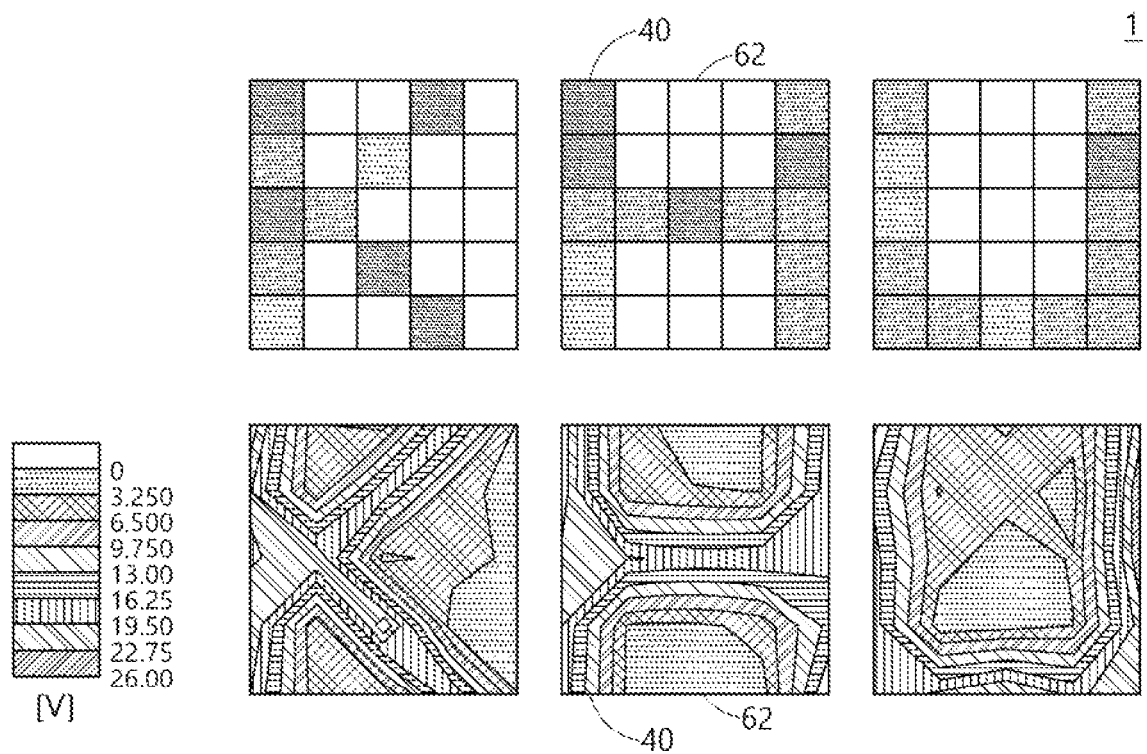

TRIBOELECTRIC NANOGENERATOR USING IONIC ELASTOMER

CROSS-REFERENCE TO RELATED APPLICATION

This application is a National Stage Entry of PCT International Application No. PCT/KR2019/009366, which was filed on Jul. 26, 2019, and which claims priority to Korean Patent Application No. 10-2018-0088738, filed on Jul. 30, 2018 in the Korean Intellectual Property Office, the disclosure of which is incorporated herein by reference.

TECHNICAL FIELD

The present invention relates to an triboelectric nanogenerator using an ionic elastomer, and more particularly, to an triboelectric nanogenerator using an ionic elastomer, wherein the triboelectric nanogenerator generates electrical energy by bringing an ionic elastomer including an ionic liquid into contact with a charging material that is charged with a polarity opposite to the ionic elastomer and separating the ionic elastomer and the charging material from each other.

BACKGROUND ART

Generation of energy occurs frequently in daily life. For example, pressure energy is generated when pressing the floor with the soles of the feet during walking, and vibration and heat energy are generated when a car, train, or airplane moves. However, energy generated in this way is lost. Here, energy harvesting involves collecting energy lost as described above and converting the collected energy into electricity.

That is, energy harvesting is a technology for harvesting a small amount of energy that is routinely discarded or not used and converting the harvested energy into usable electrical energy. Vibration and heat generated from machinery operating in factories or power plants, and electromagnetic waves continuously emitted from cell phone base stations or broadcasting stations are finally converted into sound or heat and are lost in the atmosphere. Accordingly, a small amount of energy released in this way may be collected and used as electrical energy. In this case, electrostatic power generation may be used for energy harvesting. In electrostatic power generation, electricity is generated by friction. That is, unlike conventional eco-friendly energy generation methods such as power generation using a solar cell, hydropower, and wind power, in electrostatic power generation, microscopic vibrations generated in surrounding environments or consumable mechanical energy generated during operation may be converted into electrical energy.

This energy conversion method using electrostatic properties has high conversion efficiency, and miniaturization and weight reduction may be applied to the method. In addition, development of breakthrough technology that combines the energy conversion method and nanotechnology is expected.

In the case of frictional electricity using an electrostatic phenomenon, energy is generated by difference in charge due to static electricity generated when two materials are brought into contact with each other and then separated from each other. Unlike conventional eco-friendly solar cells and wind power generation, the frictional electricity method is a new eco-friendly energy generation concept that may convert consumable mechanical energy into electrical energy.

The energy conversion method using frictional electricity has high conversion efficiency, and miniaturization and weight reduction may be applied to the method. In addition, when the method is fused with nanotechnology, the ripple effect is expected to be very large.

DISCLOSURE

Technical Problem

Therefore, the present invention has been made in view of the above problems, and it is one object of the present invention to generate electrical energy by using an ionic elastomer including an ionic material for electrostatic power generation.

It is another object of the present invention to provide an triboelectric nanogenerator with improved output using an ionic elastomer.

It is still another object of the present invention to increase an electric capacity inside a charging material to generate a large amount of electrical energy.

It is yet another object of the present invention to allow a large amount of electric charge to be located on the surface of a charging material.

Technical Solution

In accordance with one aspect of the present invention, provided is an triboelectric nanogenerator using an ionic elastomer, the triboelectric nanogenerator including a first electrode; an ionic elastomer disposed on the first electrode and including an elastomer and an ionic liquid; a second electrode disposed to be spaced apart from the first electrode and electrically connected to the first electrode; and an insulator disposed under the second electrode, selectively contacting the ionic elastomer, and formed of a material that has a negative charge compared to the ionic elastomer, wherein the ionic elastomer and the insulator are brought into contact with each other or are separated from each other by external force, and electrical energy is generated between the first and second electrodes when the ionic elastomer and the insulator are brought into contact with each other and separated from each other.

Preferably, according to the present invention, a concentration of the ionic liquid included in the ionic elastomer may be 5 to 15% by weight.

Preferably, according to the present invention, a concentration of the ionic liquid included in the ionic elastomer may be 10% by weight.

Preferably, according to the present invention, the elastomer included in the ionic elastomer may be formed of thermoplastic polyurethane (TPU).

Preferably, according to the present invention, the insulator may be formed of Teflon.

Preferably, according to the present invention, the first and second electrodes may each be formed of a metallic material.

Preferably, according to the present invention, when the ionic elastomer and the insulator are brought into contact with each other and separated from each other by external force, ionic layers (i.e., electric double layers, EDLs) may be formed in upper and lower portions of the ionic elastomer by an ion squeezing phenomenon.

Preferably, according to the present invention, a surface of the ionic elastomer may be charged with a positive charge, a surface of the insulator may be charged with a negative charge, an anionic layer may be formed in an upper portion of the ionic elastomer, and a cationic layer may be formed in a lower portion of the ionic elastomer.

Preferably, according to the present invention, the triboelectric nanogenerator may function as a sensor that detects a magnitude of the external force by measuring output of electrical energy generated between the first and second electrodes.

Preferably, according to the present invention, the ionic elastomer may be prepared by a method including a step of dissolving the thermoplastic polyurethane in an organic substance-dissolving material at a preset temperature for a preset time; a step of mixing the organic substance-dissolving material, in which the thermoplastic polyurethane has been dissolved, and the ionic liquid and performing dissolution at a preset temperature for a preset time; and a step of pouring the solution containing the ionic liquid into a mold and performing drying in an oven at a preset temperature for a preset time.

Preferably, according to the present invention, the organic substance-dissolving material may be dimethylformamide (DMF); 16% by weight or more of the thermoplastic polyurethane may be dissolved in dimethylformamide at a temperature range of 60° C. to 90° C. for 3 hours; the dimethylformamide solution, in which the thermoplastic polyurethane has been dissolved, and the ionic liquid may be mixed, and dissolution may be performed at a temperature range of 60° C. to 90° C. for 3 hours or more; and a solution containing the ionic liquid may be poured into a mold, and drying may be performed in an oven at a temperature range of 80° C. to 140° C. for 4 hours or more.

Preferably, according to the present invention, the triboelectric nanogenerator may further include a pressurizer for applying external force by selectively contacting the first or second electrode.

Preferably, according to the present invention, the pressurizer may be a cam that periodically presses the first or second electrode.

Preferably, according to the present invention, a plurality of protrusions may be provided on one surface of the ionic elastomer.

In accordance with another aspect of the present invention, provided is an triboelectric nanogenerator using an ionic elastomer, the triboelectric nanogenerator including a first electrode; a first insulator disposed on one surface of the first electrode; a second electrode disposed to be spaced apart from the first electrode and connected to the first electrode via a wire; and a second insulator disposed on one surface of the second electrode and arranged to face the first insulator, wherein the second insulator is brought into contact with the first insulator or is separated from the first insulator by external force, wherein at least one of the first and second insulators is formed of an ionic elastomer including an elastomer and an ionic liquid.

Preferably, according to the present invention, a concentration of the ionic liquid included in the ionic elastomer may be 5 to 15% by weight.

Preferably, according to the present invention, a concentration of the ionic liquid included in the ionic elastomer may be 10% by weight.

Advantageous Effects

In an triboelectric nanogenerator using an ionic elastomer according to the present invention, when pressure is applied to an ionic elastomer, ions are separated to both sides of the inside of the ionic elastomer due to an ion squeezing phenomenon to form electric double layers, thereby improving output.

According to the present invention, the magnitude of electrical output is proportional to pressure applied to the triboelectric nanogenerator, and thus the voltage of electrical energy generated can be measured.

According to the present invention, when pressure is applied to the triboelectric nanogenerator, pressure sensing and power generation can be performed at the same time.

DESCRIPTION OF DRAWINGS

FIG. 1 schematically illustrates an triboelectric nanogenerator using an ionic elastomer according to the present invention.

FIG. 2 illustrates arrangement of ions in an ionic elastomer when pressure is applied to an triboelectric nanogenerator using an ionic elastomer according to the present invention.

FIG. 3 includes graphs for explaining an ion squeezing phenomenon that occurs when external force is applied to an triboelectric nanogenerator using an ionic elastomer according to the present invention.

FIG. 4 shows another embodiment of an triboelectric nanogenerator using an ionic elastomer according to the present invention.

FIG. 5 includes perspective views of a device for pressurizing the electrodes of an triboelectric nanogenerator using an ionic elastomer according to the present invention.

FIG. 6 includes graphs comparing the outputs and sensitivity of voltages generated when thermoplastic polyurethane is mixed with an ionic liquid of various concentrations when manufacturing an triboelectric nanogenerator using an ionic elastomer according to the present invention.

FIG. 7 is a graph showing, in thermoplastic polyurethane according to the present invention mixed with an ionic liquid of various concentrations, electrical outputs generated when a predetermined strength of pressure is applied to the ionic liquid.

FIG. 8 includes graphs comparing moduli of elasticity and internal resistances of an electrolyte depending on the concentrations of an ionic liquid in thermoplastic polyurethane according to the present invention.

FIG. 9 is a graph comparing dielectric constants according to frequency sweep in an ionic elastomer according to the present invention.

FIG. 10 shows a flowchart for explaining a process of preparing an ionic elastomer in a process of manufacturing an triboelectric nanogenerator using an ionic elastomer according to the present invention.

FIG. 11 shows a sensor composed of an triboelectric nanogenerator using an ionic elastomer according to the present invention.

FIG. 12 includes drawings for explaining charging of electrical energy generated in an triboelectric nanogenerator using an ionic elastomer according to the present invention.

BEST MODE

Specific structural and functional descriptions of embodiments according to the concept of the present invention disclosed herein are merely illustrative for the purpose of explaining the embodiments according to the concept of the present invention. Furthermore, the embodiments according to the concept of the present invention can be implemented in various forms, and the present invention is not limited to the embodiments described herein, but includes changes, equivalents, or alternatives falling within the spirit and scope of the present invention.

Hereinafter, the present invention will be described in detail with reference to the accompanying drawings.

FIG. 1 schematically illustrates an triboelectric nanogenerator using an ionic elastomer according to the present invention.

An triboelectric nanogenerator 1 using an ionic elastomer (hereinafter referred to as "triboelectric nanogenerator") relates to energy harvesting using an electrostatic phenomenon, and generates electrical energy using a phenomenon in which a positively charged material and a negatively charged material are charged due to an electrostatic phenomenon.

The triboelectric nanogenerator 1 includes a first electrode 30; an ionic elastomer 40 disposed on the first electrode 30 and including an elastomer and an ionic liquid; a second electrode 10 disposed to be spaced apart from the first electrode 30 and electrically connected to the first electrode 30; and an insulator 20 disposed under the second electrode 10, selectively contacting the ionic elastomer 40, and formed of a material that has a negative charge compared to the ionic elastomer 40.

In addition, the ionic elastomer 40 and the insulator 20 are brought into contact with each other or are separated from each other by external force, and electrical energy is generated between the first and second electrodes 30 and 10 when the ionic elastomer 40 and the insulator 20 are brought into contact with each other and separated from each other. That is, current may flow in a wire connecting the first and second electrodes 30 and 10 when the ionic elastomer 40 and the insulator 20 are brought into contact with each other and separated from each other.

The elastomer included in the ionic elastomer 40 may be formed of thermoplastic polyurethane (TPU), and the insulator 20 may be formed of Teflon and may use a negatively charged material. In addition, the first and second electrodes 30 and 10 may each be formed of aluminum, which is a metallic material. However, the materials for the ionic elastomer 40, the insulator 20, and the first and second electrodes 30 and 10 are not limited thereto.

In addition, the thermoplastic polyurethane, which is a representative material for the elastomer included in the ionic elastomer 40, is composed of a segmented block copolymer consisting of hard segments having a rigid molecular chain and soft segments having a flexible structure. Since the hard segments have a glass transition temperature (Tg) higher than room temperature, a physical crosslinking point is formed due to crystal formation, hydrogen bonding, or Van der Waals force between the hard segments exhibiting glassy properties. On the other hand, since the soft segments have a glass transition temperature lower than room temperature, the soft segments serve to impart the main characteristics of an elastic body exhibiting rubbery properties, such as a high elongation ratio, a high elastic modulus, and a high elastic recovery rate. When these segments are subjected to external force, the orientation and structure thereof may be changed.

Elastomers, such as thermoplastic polyurethanes, are positively charged materials composed of a visco-poroelastic material. When an ionic liquid is added to thermoplastic polyurethane as in the present invention, the amount of an ionic material included in the thermoplastic polyurethane increases, and thus the internal electric capacity of the thermoplastic polyurethane further increases. The electric capacity increased in this way varies depending on the amount of surface charge generated through the electrostatic principle.

In a state wherein ions are contained in thermoplastic polyurethane, when external pressure is applied to the inside of the thermoplastic polyurethane, i.e., a visco-poroelastic material, the ions present inside the thermoplastic polyurethane may be separated in both directions parallel to the applied external pressure (i.e., ion-squeezing phenomenon).

In general, as the amount of electric charge included in the ionic elastomer 40 increases, an ion squeezing phenomenon in which ions are separated in the ionic elastomer 40 may be facilitated, thereby increasing electrical output. However, when the concentration of an ionic liquid is too high (for example, when the concentration of an ionic liquid is greater than 15% by weight), electric charge to be accumulated on the surface of the ionic elastomer 40 may be screened out due to an ion squeezing phenomenon by the ionic liquid, so that electrical output may not be improved. Accordingly, the maximum output may be achieved only when the concentration of the ionic liquid and the composition ratio of the ionic elastomer 40 are optimized.

To improve electrical output, 5 to 15% by weight of the ionic liquid is preferably mixed with the thermoplastic polyurethane. Most preferably, 10% by weight of the ionic liquid is mixed with the thermoplastic polyurethane.

FIG. 2 illustrates arrangement of ions when pressure is applied to an triboelectric nanogenerator using an ionic elastomer according to the present invention.

When the ionic elastomer 40 and the insulator 20 are brought into contact with each other and separated from each other by external force, ionic layers (i.e., electric double layers, EDLs) are formed in the upper and lower portions of the ionic elastomer 40 due to an ion squeezing phenomenon.

Accordingly, in addition to potential difference, the triboelectric nanogenerator 1 enables movement of ions due to external stimulation, thereby improving output. That is, an anionic layer is formed in the upper portion of the ionic elastomer 40 and a cationic layer is formed in the lower portion of the ionic elastomer 40, so that the surface of the ionic elastomer 40 is positively charged and the surface of the insulator 20 is negatively charged. Here, the ionic layers are electric double layers, are present inside the ionic elastomer 40, and relate to a phenomenon that ions are accumulated at an interface due to external potential difference.

When the triboelectric nanogenerator 1 is pressurized, the ionic elastomer 40 is brought into contact with the insulator 20, and a positive charge present in the ionic elastomer 40 moves toward the first electrode 30 and a negative charge moves toward the second electrode 10, i.e., separation of ions occurs. Among ions contained inside the ionic elastomer 40, anions move toward the insulator 20 and cations move in the opposite direction. Thus, ions are separated in both sides. As two electric layers are generated, a large amount of electric charge may be formed on the surface of the triboelectric nanogenerator 1, thereby increasing output.

When external pressure is applied to both electrodes 10 and 30, as the ionic elastomer 40 and the insulator 20 are brought into contact with each other, separation of ions occurs inside the ionic elastomer 40. In this case, as external pressure increases, separation of ions inside the ionic elastomer 40 is promoted and electrical output generated between the electrodes 10 and 30 increases. On the other hand, as an external pressure applied to the electrodes 10 and 30 decreases, separation of ions inside the ionic elastomer 40 is less promoted and electrical output generated between the electrodes 10 and 30 decreases.

That is, the magnitude of external pressure applied to the electrodes 10 and 30 is proportional to electrical output generated in the electrodes 10 and 30. Accordingly, by measuring the output of electrical energy generated between the first and second electrodes 30 and 10 according to such a principle, the triboelectric nanogenerator 1 may function as a sensor for detecting the magnitude of external force.

In addition, the flow of current generated between the first and second electrodes 30 and 10 varies according to a surface area where the ionic elastomer 40 and the insulator 20 are in contact with each other, the strength of force exerted upon colliding, the speed of a device upon colliding, a distance between a positively charged material and a negatively charged material, the thickness of a device, and the degree of surface charge.

FIG. 3 includes graphs for explaining an ion squeezing phenomenon that occurs when external force is applied to an triboelectric nanogenerator using an ionic elastomer according to the present invention.

The graphs of FIG. 3 show that an ion squeezing phenomenon is promoted by external force.

In addition, it can be confirmed that, when comparing pressure-dependent capacitance change between thermoplastic polyurethane without ions and thermoplastic polyurethane including an ionic liquid, in the triboelectric nanogenerator 1 including the ionic liquid, electric double layers are formed at electrode interfaces by an electric field. In addition, as pressure increases, movement of ions due to a squeezing phenomenon is facilitated, and thus an electrostatic output increases.

FIG. 4 shows another embodiment of an triboelectric nanogenerator using an ionic elastomer according to the present invention, showing a perspective view of an ionic elastomer having a plurality of protrusions arranged on one surface thereof.

On one surface of the ionic elastomer 40, a plurality of protrusions 42 may be arranged in an array. The protrusions 42 each have a hemispherical shape. When external force is applied to the ionic elastomer 40 including the protrusions 42, a surface having the protrusions 42 thereon is brought into contact with the insulator 20. In this case, due to the protrusions 42, a surface area where the ionic elastomer 40 and the insulator 20 are in contact with each other increases. Accordingly, as the contact surface area increases, a large amount of electric charge may be generated on the surface of the ionic elastomer 40, thereby increasing electrical output.

The contact surface area of the protrusions 42 may be adjusted according to the strength of external pressure. In addition, the shape, size, and number of the protrusions 42 may be adjusted to suit the user's purpose. That is, in addition to a hemispherical shape, the protrusions 42 included in the ionic elastomer 40 may have any shapes as long as the shapes are capable of providing an uneven surface to increase a surface area where the ionic elastomer 40 and the insulator 20 are in contact with each other by external pressure.

FIG. 5 includes perspective views of a device for pressurizing the electrodes of an triboelectric nanogenerator using an ionic elastomer according to the present invention.

The triboelectric nanogenerator of the present invention further includes a pressurizer 50 that selectively contacts the first electrode 30 or the second electrode 10 to apply external force thereto. As an eccentric cam 52 in direct contact with any one of the first and second electrodes 30 and 10 rotates, pressing and non-pressing of the electrodes 10 and 30 occur, such that the ionic elastomer 40 and the insulator 20 are brought into contact with each other and separated from each other.

That is, when protrusions 54 of the eccentric cam 52 contact the electrodes 10 and 30, the electrodes 10 and 30 are compressed by the protrusions 54 of the eccentric cam 52 so that the ionic elastomer 40 and the insulator 20 are brought into contact with each other. On the other hand, when the protrusions 54 of the eccentric cam 52 pass the electrodes 10 and 30, the compressed electrodes 10 and 30 return to the original positions thereof so that the ionic elastomer 40 and the insulator 20 are separated from each other. By repeating this process, the triboelectric nanogenerator 1 may generate electricity.

FIG. 6 includes graphs comparing the outputs of voltages generated when thermoplastic polyurethane is mixed with an ionic liquid of various concentrations when manufacturing an triboelectric nanogenerator using an ionic elastomer according to the present invention.

When thermoplastic polyurethane was mixed with an ionic liquid at a concentration of 5 wt %, 10 wt %, 20 wt %, 30 wt %, 40 wt %, or 50 wt %, and the outputs of voltages generated from the triboelectric nanogenerator 1 according to the concentrations of the ionic liquid were compared, the output was highest when the ionic liquid of 10 wt % concentration was mixed. On the other hand, when the ionic liquid of 50 wt % concentration was mixed, the output is lower than that of the triboelectric nanogenerator 1 manufactured using only the thermoplastic polyurethane, showing the lowest efficiency. Looking at voltage sensitivity for pressures within 20 kPa, a high sensitivity of about 22 V kPa−1 is exhibited at 10 wt %. It can be seen that these results are due to the ion squeezing phenomenon and internal resistance by pressure as described above.

Next, it can be seen that, when the thermoplastic polyurethane is mixed with the ionic liquid at a concentration of 5 wt % or 20 wt %, the output of the triboelectric nanogenerator 1 is high. In particular, the 5 wt %, 10 wt %, and 20 wt % ionic elastomers 40 that show high outputs generate almost the same output when a pressure of 5 kPa to 15 kPa is applied. After 15 kPa, as the strength of pressure applied to the triboelectric nanogenerator 1 increases, the output increases rapidly. In particular, the output is the highest when mixing at a concentration of 10 wt %. These results indicate that, when the thermoplastic polyurethane is mixed with the ionic liquid at a concentration of 5 to 15 wt %, the triboelectric nanogenerator 1 is most effective.

FIG. 7 is a graph showing, in thermoplastic polyurethane according to the present invention mixed with an ionic liquid of various concentrations, electrical outputs generated when a predetermined strength of pressure is applied to the ionic liquid, and FIG. 7 shows a graph comparing internal resistances of an electrolyte depending on the concentrations of an ionic liquid in thermoplastic polyurethane according to the present invention.

FIG. 7 relates to the output of power generated when a vibration of 4 Hz and a pressure of 25 kPa are applied to the ionic elastomers 40 prepared by mixing the thermoplastic polyurethane and the ionic liquid at a concentration of 5 wt %, 10 wt %, 20 wt %, 30 wt %, 40 wt %, or 50 wt %.

When the ionic liquid is mixed at a concentration of 5 wt % to 20 wt %, high power output is exhibited. When the ionic liquid is mixed at a concentration of 10 wt %, the highest power output is exhibited.

A high power output is observed at 10 wt %. This indicates that electric charge is accumulated on the surface of the ionic elastomer 40, the amount of electric charge on the surface is increased, and the increased electric charge on the surface increases output in electrostatic power generation. On the contrary, decrease in the output of power means that the amount of charge on a surface is reduced due to reduction of charge accumulated on the surface and the overlapping effect with the inside of an electrolyte.

Accordingly, the ionic elastomer 40 is preferably prepared by mixing the thermoplastic polyurethane and an ionic liquid at a concentration of 5 to 20 wt %. Most preferably, when using the triboelectric nanogenerator 1 including the ionic elastomer 40 prepared by mixing the ionic liquid at a concentration of 10 wt %, the largest amount of electrical energy is generated.

FIG. 8 includes graphs comparing moduli of elasticity and internal resistances of an electrolyte depending on the concentrations of an ionic liquid in thermoplastic polyurethane according to the present invention, and FIG. 9 is a graph comparing dielectric constants according to frequency sweep in an ionic elastomer according to the present invention.

The ionic elastomer 40 is prepared by mixing thermoplastic polyurethane and an ionic liquid, and the modulus of elasticity (Young's modulus) of the ionic elastomer 40 decreases. Accordingly, the ionic liquid permeates regions between polymer chains to reduce the interaction between the polymer chains. Thereby, the movement path of ions becomes more smooth, so that the mobility of ions is increased and internal resistance is reduced.

In addition, as a method of determining the presence or absence of an ionic layer (EDL), when a frequency sweep is performed for each material, the level difference between a low-frequency dielectric constant and a high-frequency dielectric constant increases. The large level difference indicates the presence of an ionic layer.

FIG. 10 shows a flowchart for explaining a process of manufacturing an triboelectric nanogenerator using an ionic elastomer according to the present invention.

In the ionic elastomer 40, thermoplastic polyurethane and an ionic liquid are mixed in an appropriate ratio. A manufacturing process for applying the ionic elastomer 40 to the triboelectric nanogenerator 1 is as follows.

The manufacturing process includes step S10 of dissolving the thermoplastic polyurethane in an organic substance-dissolving material at a preset temperature for a preset time, step S20 of mixing the organic substance-dissolving material, in which the thermoplastic polyurethane has been dissolved, and an ionic liquid and performing dissolution at a preset temperature for a preset time, and step S30 of pouring the solution containing the ionic liquid into a mold and performing drying in an oven at a preset temperature for a preset time.

In this case, the organic substance-dissolving material is dimethylformamide (DMF), 16% by weight of the thermoplastic polyurethane is dissolved in dimethylformamide at 60° C. for 3 hours. Preferably, 16% by weight or more of the thermoplastic polyurethane is dissolved at 60° C. to 90° C. for 3 hours or more.

In addition, the ionic liquid is mixed with the dimethylformamide solution in which the thermoplastic polyurethane has been dissolved, and dissolution is performed at 60° C. for 3 hours. Then, the solution containing the ionic liquid is poured into a mold and drying is performed in an oven at 120° C. for 24 hours. Preferably, drying is performed in an oven at a temperature of 80° C. to 140° C. for 4 hours or more.

FIG. 11 shows a sensor composed of an triboelectric nanogenerator using an ionic elastomer according to the present invention, and FIG. 12 includes drawings for explaining charging of electrical energy generated in an triboelectric nanogenerator using an ionic elastomer according to the present invention.

The triboelectric nanogenerator 1 according to the present invention may be used as a pressure sensor 60 for detecting pressure applied to the triboelectric nanogenerator 1 through the principle of an electrostatic device. The triboelectric nanogenerators 1 may be arranged on a substrate 62 in a 5×5 array, and this is manufactured in a mapping arrangement.

In addition, real-time mapping is performed by connecting the pressure sensor 60 made of the triboelectric nanogenerator 1 with a wire so that LED light may be emitted where pressure is applied. Accordingly, as pressure applied to the triboelectric nanogenerator 1 is recognized by the sensor, the intensity of light emitted varies according to the magnitude of the pressure. In addition, using this principle, it is also possible to measure voltage according to external pressure.

In addition, when a capacitor is connected to the triboelectric nanogenerator 1, other electronic devices may be charged. That is, since the magnitude of voltage is proportional to pressure applied to the triboelectric nanogenerator 1, when high pressure is applied to the triboelectric nanogenerator 1, an electronic device may be charged with a high voltage.

Unlike the conventional pressure sensor 60 that uses difference in piezoelectricity, resistance, or electric capacity, the triboelectric nanogenerator 1 may be manufactured by a simple method, a micro-/nano-pattern is not formed on the surface thereof, and the area or size thereof may be easily adjusted according to the user's convenience. In addition, since thermoplastic polyurethane, which a visco-poroelastic material, is used, by maximizing the advantages of an ionic liquid, the triboelectric nanogenerator 1 may be used as the pressure sensor 60 that generates the different levels of output according to the magnitude of external pressure.

Since thermoplastic polyurethane is used as the ionic elastomer 40, a transparent polymer, a transparent electrode, or a transparent pressure sensor may be manufactured using transparent properties, which are one of the characteristics of thermoplastic polyurethane.

Self-powered systems and transparent stress sensor systems may be manufactured using transparent polymers or transparent electrodes, and due to the flexible properties of polymers, flexible devices may be manufactured.

The transparent pressure sensor 60 may also be used in the display field. For example, when the triboelectric nanogenerator 1 is applied to smartphones, the triboelectric nanogenerator 1 may be used as a touch screen, and a battery may be charged with power generated by touching the screen. In addition to smartphones, the triboelectric nanogenerator 1 may be applied to televisions or keyboards.

As described above, the present invention has been described with reference to certain preferred embodiments, but the present invention is not limited to the above-described embodiments, and various changes and modifications may be made without departing from the spirit of the present invention.

The invention claimed is:

1. A triboelectric nanogenerator using an ionic elastomer, the triboelectric nanogenerator comprising:
a first electrode;
an ionic elastomer disposed on the first electrode and comprising an elastomer and an ionic liquid;

a second electrode disposed to be spaced apart from the first electrode and electrically connected to the first electrode; and an insulator disposed under the second electrode, contacting or separating the ionic elastomer, and formed of a material that has a negative charge compared to the ionic elastomer, wherein the ionic elastomer and the insulator are brought into contact with each other or are separated from each other by external force, and electrical energy is generated between the first and second electrodes when the ionic elastomer and the insulator are brought into contact with each other and separated from each other, wherein a plurality of protrusions are provided on one surface of the ionic elastomer to face the insulator so that charge generation increases as a contact surface area between the ionic elastomer and the insulator increases by an external force, wherein the insulator and the ionic elastomer are pressed by the external force so that one surface of the ionic elastomer provided with the plurality of protrusions contacts or separates from the insulator, and electric double layers (EDLs) capable of generating electrical energy by triboelectrification are formed in the ionic elastomer, and the electrical energy is generated between the first electrode and the second electrode according to pressure and charge generated when the ionic elastomer and the insulator are contacted and separated, and wherein the elastomer is formed of thermoplastic polyurethane, and the ionic liquid is mixed with the thermoplastic polyurethane at a concentration of 5 to 15% by weight.

2. The triboelectric nanogenerator according to claim 1, wherein a concentration of the ionic liquid comprised in the ionic elastomer is 10% by weight.

3. The triboelectric nanogenerator according to claim 1, wherein the elastomer comprised in the ionic elastomer is formed of thermoplastic polyurethane (TPU).

4. The triboelectric nanogenerator according to claim 3, wherein the ionic elastomer is prepared by a method comprising a step of dissolving the thermoplastic polyurethane in an organic substance-dissolving material at a preset temperature for a preset time;

a step of mixing the organic substance-dissolving material, in which the thermoplastic polyurethane has been dissolved, and the ionic liquid and performing dissolution at a preset temperature for a preset time; and a step of pouring the solution containing the ionic liquid into a mold and performing drying in an oven at a preset temperature for a preset time.

5. The triboelectric nanogenerator according to claim 4, wherein the organic substance-dissolving material is dimethylformamide (DMF);

16% by weight or more of the thermoplastic polyurethane is dissolved in dimethylformamide at a temperature range of 60° C. to 90° C. for 3 hours;

the dimethylformamide solution, in which the thermoplastic polyurethane has been dissolved, and the ionic liquid are mixed, and dissolution is performed at a temperature range of 60° C. to 90° C. for 3 hours or more; and a solution containing the ionic liquid is poured into a mold, and drying is performed in an oven at a temperature range of 80° C. to 140° C. for 4 hours or more.

6. The triboelectric nanogenerator according to claim 1, wherein the insulator is formed of Teflon.

7. The triboelectric nanogenerator according to claim 1, wherein the first and second electrodes are each formed of at least one of metallic materials and conductive materials such as ITO, graphene, transparent electrodes, and conductive polymers.

8. The triboelectric nanogenerator according to claim 1, wherein, when the ionic elastomer and the insulator are brought into contact with each other and separated from each other by external force, the electric double layers (EDLs) are formed inside the ionic elastomer by an ion squeezing phenomenon.

9. The triboelectric nanogenerator according to claim 8, wherein a surface of the ionic elastomer is charged with a positive charge, a surface of the insulator is charged with a negative charge, an anionic layer is formed in an upper portion of the ionic elastomer, and a cationic layer is formed in a lower portion of the ionic elastomer.

10. The triboelectric nanogenerator according to claim 1, wherein the triboelectric nanogenerator functions as a sensor that detects a magnitude of the external force by measuring output of electrical energy generated between the first and second electrodes.

11. The triboelectric nanogenerator according to claim 1, further comprising a pressurizer for applying external force by selectively contacting the first or second electrode.

12. The triboelectric nanogenerator according to claim 11, wherein the pressurizer is a cam that periodically presses the first or second electrode.

13. A triboelectric nanogenerator using an ionic elastomer, the triboelectric nanogenerator comprising:

a first electrode;

a first insulator disposed on one surface of the first electrode;

a second electrode disposed to be spaced apart from the first electrode and connected to the first electrode via a wire; and a second insulator disposed on one surface of the second electrode and arranged to face the first insulator, wherein the second insulator is brought into contact with the first insulator or is separated from the first insulator by external force, wherein at least one of the first and second insulators is formed of an ionic elastomer comprising an elastomer and an ionic liquid, wherein a plurality of protrusions are provided on one surface of the ionic elastomer to face the first insulator or the second insulator so that charge generation increases as a contact surface area between the first insulator and the second insulator increases by an external force, wherein the first insulator and the second insulator are pressed by the external force to contact or separate from each other, and electric double layers (EDLs) capable of generating electrical energy by triboelectrification are formed in the ionic elastomer, and the electrical energy is generated between the first electrode and the second electrode according to pressure and charge generated when the first insulator and the second insulator are contacted and separated, and wherein the elastomer is formed of thermoplastic polyurethane, and the ionic liquid is mixed with the thermoplastic polyurethane at a concentration of 5 to 15% by weight.

14. The triboelectric nanogenerator according to claim 13, wherein a concentration of the ionic liquid comprised in the ionic elastomer is 10% by weight.

* * * * *